United States Patent
Jin et al.

(10) Patent No.: US 12,171,045 B2
(45) Date of Patent: Dec. 17, 2024

(54) METHOD AND DEVICE FOR REPORTING TERMINAL CAPABILITY FOR MULTIPLE RADIO TRANSMISSION SCHEMES IN NEXT GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 558 days.

(21) Appl. No.: 17/416,933

(22) PCT Filed: Dec. 20, 2019

(86) PCT No.: PCT/KR2019/018193
§ 371 (c)(1),
(2) Date: Jun. 21, 2021

(87) PCT Pub. No.: WO2020/130709
PCT Pub. Date: Jun. 25, 2020

(65) Prior Publication Data
US 2022/0086625 A1 Mar. 17, 2022

(30) Foreign Application Priority Data
Dec. 21, 2018 (KR) .................. 10-2018-0167257

(51) Int. Cl.
*H04W 8/24* (2009.01)
*H04W 84/04* (2009.01)

(52) U.S. Cl.
CPC ............ *H04W 8/24* (2013.01); *H04W 84/042* (2013.01)

(58) Field of Classification Search
None
See application file for complete search history.

(56) References Cited

U.S. PATENT DOCUMENTS

| 10,117,241 B1 | 10/2018 | Zhou et al. |
| 2012/0163301 A1 | 6/2012 | Jang |

(Continued)

FOREIGN PATENT DOCUMENTS

| KR | 10-1527637 B1 | 6/2015 |
| KR | 10-2016-0146708 A | 12/2016 |
| KR | 10-2020-0061964 A | 6/2020 |

OTHER PUBLICATIONS

Ericsson, "Correction to UE capability procedures in 38.331", Change Request, 3GPP TSG-RAN Meeting #82, Dec. 10-13, 2018, RP-182781, 38 pages.

(Continued)

*Primary Examiner* — Anh Ngoc M Nguyen

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present invention relate to a method and device for reporting terminal capability for multiple radio transmission schemes.

12 Claims, 13 Drawing Sheets

(56) References Cited

U.S. PATENT DOCUMENTS

2014/0162642 A1* 6/2014 Kwon ................. H04W 56/00
                                                    455/435.1
2015/0304838 A1  10/2015 Kanamarlapudi et al.
2019/0104432 A1*  4/2019 Dhanapal ............. H04W 76/50
2020/0169926 A1   5/2020 Hwang et al.
2021/0211865 A1*  7/2021 Li ......................... H04L 69/04

OTHER PUBLICATIONS

"3rd Generation Partnership Project; Technical Specification Group Radio Access Network; NR; Radio Resource Control (RRC) protocol specification (Release 15)", 3GPP TS 38.331 V15.3.0 (Sep. 2018), 445 pages.

Samsung, "Clarification of UE procedure when UE receives the UECapabilityEnquiry", 3GPP TSG-RAN WG2 Meeting #104, Nov. 12-16, 2018, R2-1816982, 3 pages.

International Search Report dated Apr. 2, 2020 in connection with International Patent Application No. PCT/KR2019/018193, 2 pages.

Written Opinion of the International Searching Authority dated Apr. 2, 2020 in connection with International Patent Application No. PCT/KR2019/018193, 4 pages.

Office Action issued May 22, 2024, in connection with Korean Patent Application No. 10-2021-7019321, 8 pages.

* cited by examiner

METHOD AND DEVICE FOR REPORTING TERMINAL CAPABILITY FOR MULTIPLE RADIO TRANSMISSION SCHEMES IN NEXT GENERATION MOBILE COMMUNICATION SYSTEM

CROSS-REFERENCE TO RELATED APPLICATIONS

This application is a 371 of International Application No. PCT/KR2019/018193 filed on Dec. 20, 2019, which claims priority to Korean Patent Application No. 10-2018-0167257 filed on Dec. 21, 2018, the disclosures of which are herein incorporated by reference in their entirety.

BACKGROUND

1. Field

The disclosure relates to a mobile communication system and, more particularly, to a method in which a terminal reports the capability thereof, including overall processes for reporting the terminal capability according to a size limit upon simultaneously receiving a request for a capability report regarding multiple radio access technologies from a base station, in particular.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

When a base station has instructed an NR terminal to compose a terminal capability report regarding multiple radio access technology (RAT) types through a single RRC message container, the NR terminal successively compose terminal capability reports regarding the RAT types as instructed, and sends a report message, containing the same, to the base station. However, there is a problem in that, if a predetermined RRC message size is exceeded when filling the terminal capability regarding all RAT types as instructed, a part of the terminal capability regarding a specific RAT may be omitted, and this needs to be improved. The disclosure relates to various method for solving this problem.

SUMMARY

According to an embodiment of the disclosure, a method of a terminal in a wireless communication system may include: receiving a request message for requesting terminal capability information from a base station; generating a response message including the terminal capability information, based on the received request message; identifying a size of the response message; and when the identified size of the response message exceeds a preconfigured size, dividing the response message and transmitting a plurality of divided response messages to the base station.

According to another embodiment of the disclosure, a terminal in a wireless communication system may include: a transceiver; and a controller configured to: control the transceiver to receive a request message for requesting terminal capability information from a base station; generate a response message including the terminal capability information, based on the received request message; identify a size of the response message; when the identified size of the response message exceeds a preconfigured size, divide the response message; and control the transceiver to transmit a plurality of divided response messages to the base station.

According to various embodiments of the disclosure, when a base station has instructed an NR terminal to compose a terminal capability report regarding multiple radio access technology (RAT) types through a single RRC message container, the terminal can not only clearly identify the specific RAT type, regarding which the terminal capability needs to be processed preferentially, but can also transmit the terminal capability regarding every RAT type without omission.

DETAILED DESCRIPTION

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". For example, a base station described as "eNB" may indicate "gNB". Further, the term "terminal" may refer to cellular phones, NB-IoT devices, sensors, and any other wireless communication devices.

Figure 1A:
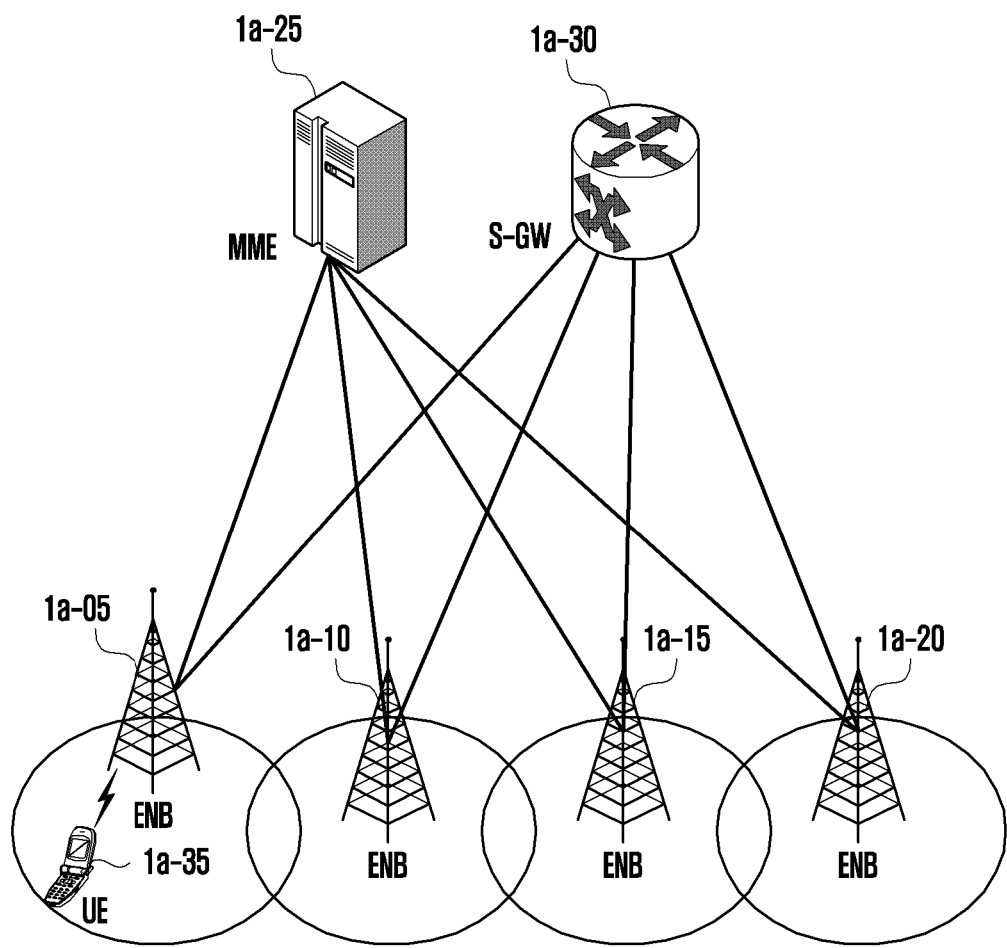
FIG. 1A illustrates a structure of an LTE system referred to for description of the disclosure.

FIG. 1A illustrates a structure of an LTE system referred to for description of the disclosure.

Referring to FIG. 1A, as shown in the drawing, a radio access network of an LTE system includes next-generation base stations (evolved node Bs, hereinafter, referred to as eNBs, Node Bs, or base stations) 1a-05, 1a-10, 1a-15, and 1a-20, a mobility management entity (MME) 1a-25, and a serving-gateway (S-GW) 1a-30. A user equipment (hereinafter, referred to as a UE or a terminal) 1a-35 accesses an external network via the eNBs 1a-05 to 1a-20 and the S-GW 1a-30.

In FIG. 1A, the eNBs 1a-05 to 1a-20 correspond to the existing Node B of a UMTS system. The eNBs are connected to the UE 1a-35 via a radio channel and perform a more complex role than the existing Node B. In the LTE system, since all user traffics including a real-time service, such as voice over IP (VoIP), through the Internet protocol, are served via a shared channel, a device for collecting and scheduling state information such as a buffer state, an available transmission power state, and a channel state of UEs is required, and the eNBs 1a-05 to 1a-20 serve as such a device. In general, one eNB controls multiple cells. For example, in order to implement a transmission rate of 100 Mbps, the LTE system uses, as a radio access technology, orthogonal frequency division multiplexing (hereinafter, referred to as OFDM) in, for example, a bandwidth of 20 MHz. Further, an adaptive modulation and coding (hereinafter, referred to as AMC) scheme for determining a modulation scheme and a channel coding rate according to a channel state of a UE is applied. The S-GW 1a-30 is a device that provides a data bearer, and generates or removes a data bearer under the control of the MME 1a-25. The MME is a device that is responsible for various control functions as well as a mobility management function for a UE, and is connected to multiple base stations.

Figure 1B:
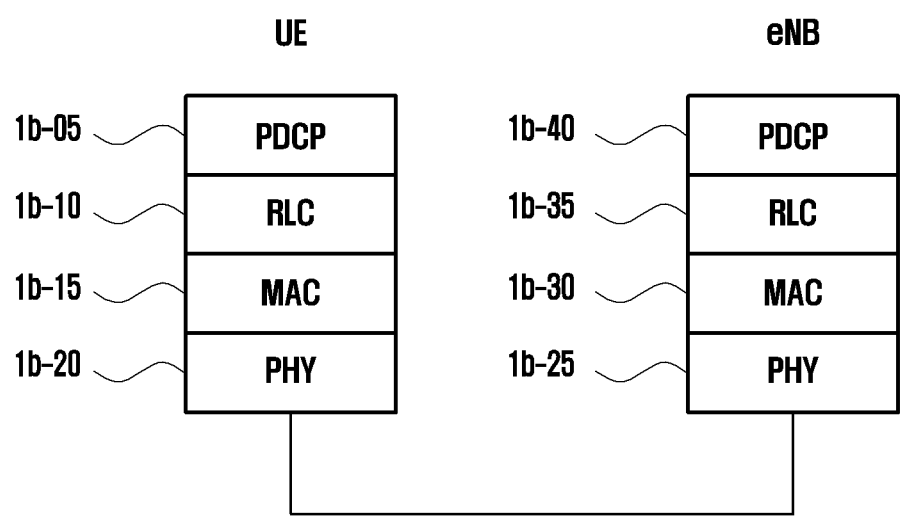
FIG. 1B illustrates a radio protocol structure in an LTE system referred to for description of the disclosure.

FIG. 1B illustrates a radio protocol structure in an LTE system referred to for description of the disclosure.

Referring to FIG. 1B, in a radio protocol of an LTE system, a UE and an eNB include packet data convergence protocols (PDCPs) 1b-05 and 1b-40, radio link controls (RLCs) 1b-10 and 1b-35, and medium access controls (MACs) 1b-15 and 1b-30, respectively. The PDCPs 1b-05 and 1b-40 are in charge of operations such as IP header compression/decompression. The main functions of the PDCP are summarized as follows.
- Header compression and decompression function (Header compression and decompression: ROHC only)
- User data transfer function (Transfer of user data)
- In-sequence delivery function (In-sequence delivery of upper layer PDUs at PDCP re-establishment procedure for RLC AM)
- Sequence reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU discard function (Timer-based SDU discard in uplink.)

The radio link controls (hereinafter, referred to as RLCs) 1b-10 and 1b-35 reconfigure a PDCP packet data unit (PDU)

to an appropriate size to perform an ARQ operation or the like. The main functions of the RLC are summarized as follows.

Data transfer function (Transfer of upper layer PDUs)
    ARQ function (Error Correction through ARQ (only for AM data transfer))
    Concatenation, segmentation, and reassembly functions (Concatenation, segmentation and reassembly of RLC SDUs (only for UM and AM data transfer))
    Re-segmentation function (Re-segmentation of RLC data PDUs (only for AM data transfer))
    Sequence reordering function (Reordering of RLC data PDUs (only for UM and AM data transfer))
    Duplicate detection function (Duplicate detection (only for UM and AM data transfer))
    Error detection function (Protocol error detection (only for AM data transfer))
    RLC SDU discard function (RLC SDU discard (only for UM and AM data transfer))
    RLC re-establishment function (RLC re-establishment)

The MACs 1b-15 and 1b-30 are connected to multiple RLC layer devices configured in one UE and, perform an operation of multiplexing RLC PDUs into an MAC PDU and demultiplexing the RLC PDUs from the MAC PDU. The main functions of the MAC are summarized as follows.

Mapping function (Mapping between logical channels and transport channels)
    Multiplexing and demultiplexing function (Multiplexing/demultiplexing of MAC SDUs belonging to one or different logical channels into/from transport blocks (TB) delivered to/from the physical layer on transport channels)
    Scheduling information reporting function (Scheduling information reporting)
    HARQ function (Error correction through HARQ)
    Priority handling function between logical channels (Priority handling between logical channels of one UE)
    Priority handling function between UEs (Priority handling between UEs by means of dynamic scheduling)
    MBMS service identification function (MBMS service identification)
    Transport format selection function (Transport format selection)
    Padding function (Padding)

Physical layers 1b-20 and 1b-25 perform an operation of channel-coding and modulating upper layer data into OFDM symbols to transmit the OFDM symbols via a radio channel, or an operation of demodulating and channel-decoding OFDM symbols received via a radio channel to transmit the demodulated and channel-decoded OFDM symbols to an upper layer. In addition, even the physical layers use a hybrid ARQ (HARQ) for additional error correction, and a receiving end transmits whether to receive a packet transmitted from a transmitting end by 1 bit. This is called HARQ ACK/NACK information. Downlink HARQ ACK/NACK information for uplink transmission may be transmitted via a physical hybrid-ARQ indicator channel (PHICH) physical channel, and uplink HARQ ACK/NACK information for downlink transmission may be transmitted via a physical uplink control channel (PUCCH) or physical uplink shared channel (PUSCH) physical channel.

The physical layers (PHYs) may include one or multiple frequencies/carriers, and a technology for simultaneously configuring and using multiple frequencies is called a carrier aggregation (hereinafter, referred to as CA) technology. In the CA technology, instead of only one carrier, one or multiple secondary carriers in addition to a primary carrier can be used for communication between a terminal (or a user equipment (UE)) and a base station (or an E-UTRAN NodeB (eNB)), so as to greatly increase the transmission quantity in proportion to the number of secondary carriers. In the LTE, a cell within a base station using a primary carrier is called a primary cell (PCell), and a secondary carrier is called a secondary cell (SCell).

Although not shown in the drawing, radio resource control (hereinafter, referred to as RRC) layers exist above PDCP layers of the UE and the eNB, respectively, and the RRC layers may transmit or receive access and measurement-related configuration control messages for a radio resource control.

Figure 1C:
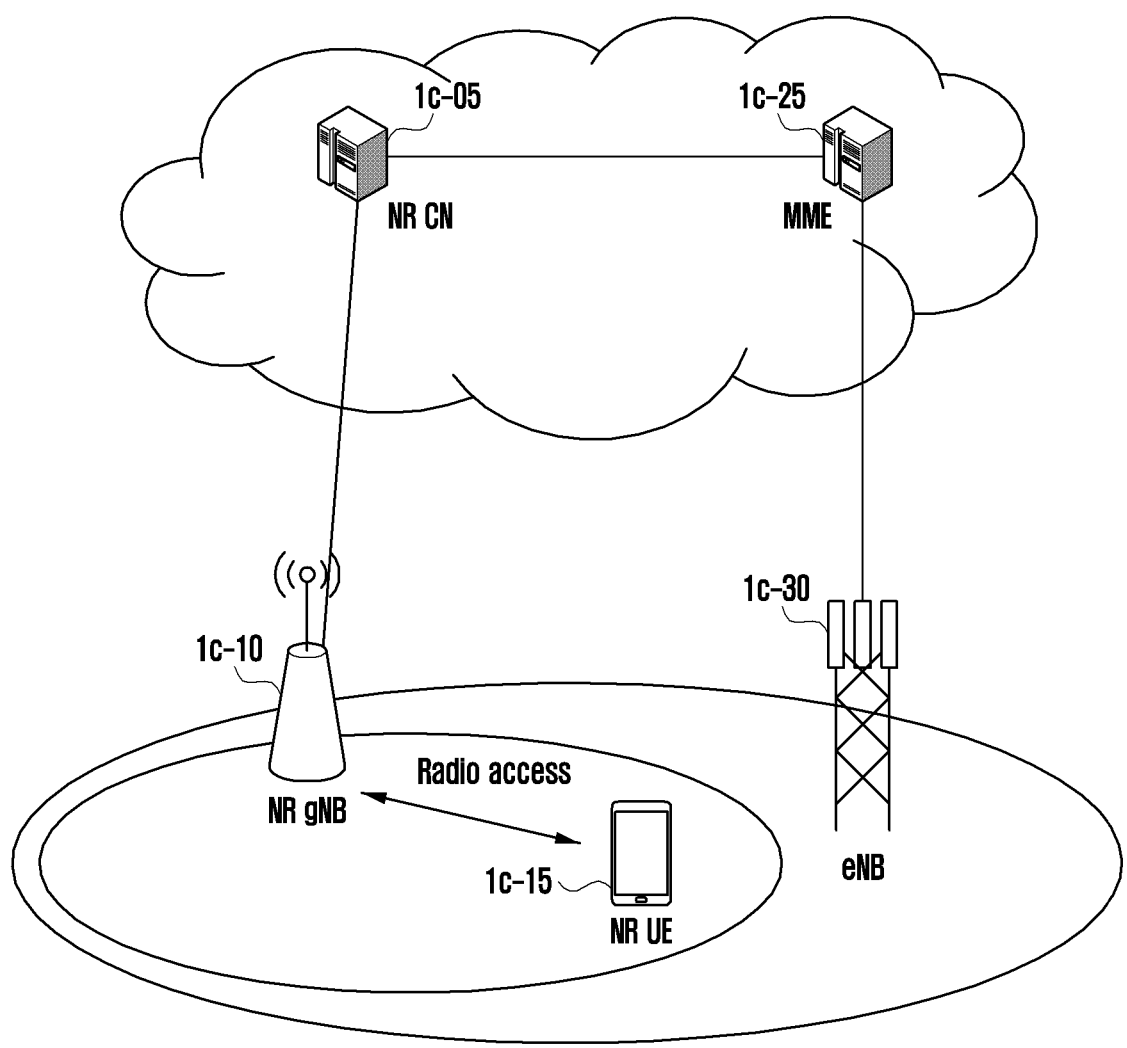
FIG. 1C illustrates a structure of a next-generation mobile communication system to which the disclosure is applied.

FIG. 1C illustrates a structure of a next-generation mobile communication system to which the disclosure is applied.

Referring to FIG. 1C, as shown in the drawing, a radio access network of a next-generation mobile communication system includes a next-generation base station (new radio node B, hereinafter, referred to as NR NB) 1c-10 and a new radio core network (NR CN) (or a next generation core network (NG CN)) 1c-05. A user equipment (new radio user equipment, hereinafter, referred to as an NR UE or terminal) 1c-15 accesses an external network via the NR NB 1c-10 and the NR CN 1c-05.

In FIG. 1C, the NR NB 1c-10 corresponds to an evolved node B (eNB) of the existing LTE system. The NR NB is connected to the NR UE 1c-15 via a radio channel and can provide a service superior to that of the existing node B. In the next-generation mobile communication system, since all user traffics are served via a shared channel, a device for collecting and scheduling state information such as a buffer state, an available transmission power state, and a channel state of UEs is required, and the NR NB 1c-10 serves as such a device. In general, one NR NB controls multiple cells. In order to realize ultra-high-speed data transmission compared to the existing LTE system, the next-generation mobile communication system may have a bandwidth equal to or greater than the maximum bandwidth of the existing system, may use, as a radio access technology, orthogonal frequency division multiplexing (hereinafter, referred to as OFDM), and may additionally employ a beamforming technique in addition thereto. In addition, an adaptive modulation and coding (hereinafter, referred to as AMC) scheme for determining a modulation scheme and a channel coding rate according to a channel state of a UE is applied. The NR CN 1c-05 performs functions such as mobility support, bearer configuration, and QoS configuration. The NR CN is a device that is responsible for various control functions as well as a mobility management function for a UE, and is connected to multiple base stations. In addition, the next-generation mobile communication system may interwork with the existing LTE system, and the NR CN is connected to an MME 1c-25 via a network interface. The MME is connected to an eNB 1c-30, which is an existing base station.

Figure 1D:
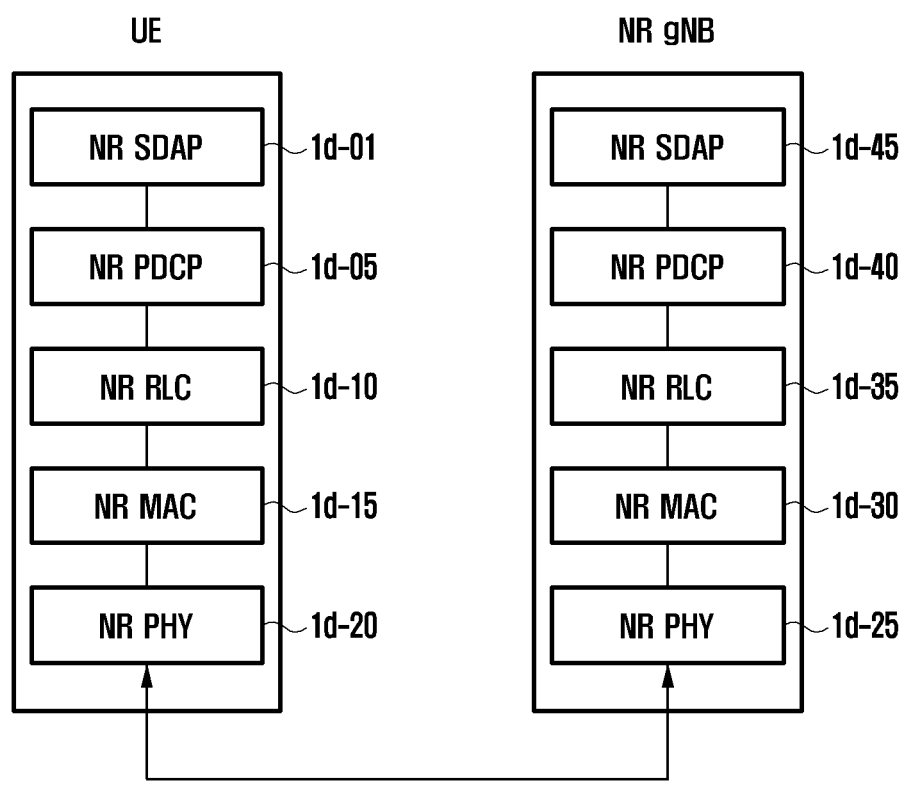
FIG. 1D illustrates a radio protocol structure of a next-generation mobile communication system to which the disclosure can be applied.

FIG. 1D illustrates a radio protocol structure of a next-generation mobile communication system to which the disclosure can be applied.

Referring to FIG. 1D, in a radio protocol of a next-generation mobile communication system, a UE and an NR base station include NR SDAPs 1d-01 and 1d-45, NR PDCPs 1d-05 and 1d-40, NR RLCs 1d-10 and 1d-35, and NR MACs 1d-15 and 1d-30, respectively.

The main functions of the NR SDAPs 1d-01 and 1d-45 may include some of the following functions.

User data transfer function (transfer of user plane data)

Mapping function of a QoS flow and a data bearer for an uplink and a downlink (mapping between a QoS flow and a DRB for both DL and UL)

Marking function of a QoS flow ID for an uplink and a downlink (marking QoS flow ID in both DL and UL packets)

Function of mapping a reflective QoS flow to a data bearer for uplink SDAP PDUs (reflective QoS flow to DRB mapping for the UL SDAP PDUs).

With respect to an SDAP layer device, whether to use a header of the SDAP layer device or whether to use a function of the SDAP layer device may be configured for a UE by an RRC message for each PDCP layer device, each bearer, or each logical channel. If an SDAP header is configured, an NAS QoS reflection configuration 1-bit indicator (NAS reflective QoS) and an AS QoS reflection configuration 1-bit indicator (AS reflective QoS) of the SDAP header may provide indication to a UE such that the UE may update or reconfigure mapping information on a data bearer and a QoS flow of an uplink and a downlink. The SDAP header may include QoS flow ID information indicating QoS. The QoS information may be used as data processing priority, scheduling information, or the like for supporting a seamless service.

The main functions of the NR PDCPs 1*d*-05 and 1*d*-40 may include some of the following functions.

Header compression and decompression function (Header compression and decompression: ROHC only)
User data transfer function (Transfer of user data)
In-sequence delivery function (In-sequence delivery of upper layer PDUs)
Out-of-sequence delivery function (Out-of-sequence delivery of upper layer PDUs)
Sequence reordering function (PDCP PDU reordering for reception)
Duplicate detection function (Duplicate detection of lower layer SDUs)
Retransmission function (Retransmission of PDCP SDUs)
Ciphering and deciphering function (Ciphering and deciphering)
Timer-based SDU discard function (Timer-based SDU discard in uplink.)

In the above description, the sequence reordering function (reordering) of an NR PDCP device refers to a function of sequentially reordering PDCP PDUs received from a lower layer, based on a PDCP sequence number (SN), may include a function of transmitting data to an upper layer in a reordered sequence, or a function of directly transmitting data without considering the sequence, and may include a function of recording lost PDCP PDUs by reordering a sequence, a function of reporting a state of the lost PDCP PDUs to a transmission side, and a function of requesting retransmission of the lost PDCP PDUs.

The main functions of the NR RLCs 1*d*-10 and 1*d*-35 may include some of the following functions.

Data transfer function (Transfer of upper layer PDUs)
In-sequence delivery function (In-sequence delivery of upper layer PDUs)
Out-of-sequence delivery function (Out-of-sequence delivery of upper layer PDUs)
ARQ function (Error Correction through ARQ)
Concatenation, segmentation, and reassembly functions (Concatenation, segmentation and reassembly of RLC SDUs)
Re-segmentation function (Re-segmentation of RLC data PDUs)
Sequence reordering function (Reordering of RLC data PDUs)
Duplicate detection function (Duplicate detection)
Error detection function (Protocol error detection)
RLC SDU discard function (RLC SDU discard)
RLC re-establishment function (RLC re-establishment)

In the above description, the in-sequence delivery function (In-sequence delivery) of an NR RLC device refers to a function of sequentially transmitting RLC SDUs received from a lower layer to an upper layer, and may include a function of, when an original one RLC SDU is divided into multiple RLC SDUs and received, reassembling and transmitting the multiple RLC SDUs, a function of reordering the received RLC PDUs, based on an RLC sequence number (SN) or a PDCP sequence number (SN), a function of recording lost RLC PDUs by reordering a sequence, a function of reporting a state of the lost RLC PDUs to a transmission side, a function of requesting retransmission of the lost RLC PDUs, and a function of, if there is a lost RLC SDU, sequentially transmitting only RLC SDUs preceding the lost RLC SDU to the upper layer, or may include a function of sequentially transmitting all RLC SDUs received before a predetermined timer starts to the upper layer if the timer expires even when there is a lost RLC SDU, or a function of sequentially transmitting all RLC SDUs currently received to the upper layer if a predetermined timer expires even when there is a lost RLC SDU. In addition, RLC PDUs may be processed in the sequence received (in the sequence of arrival, regardless of the sequence of a serial number and a sequence number), and may be transmitted to a PDCP device regardless of the sequence (out-of sequence delivery), and in the case of a segment, segments stored in a buffer or segments to be received later may be received, reconfigured into one complete RLC PDU, processed, and transmitted to the PDCP device. The NR RLC layer may not include a concatenation function, and the function may be performed in the NR MAC layer or may be replaced with a multiplexing function of the NR MAC layer.

In the above description, the out-of-sequence delivery function (out-of-sequence delivery) of the NR RLC device refers to a function of directly transmitting RLC SDUs received from a lower layer to an upper layer regardless of the sequence, and may include a function of, when an original one RLC SDU is divided into multiple RLC SDUs and received, reassembling and transmitting the multiple RLC SDUs, and a function of storing RLC SNs or PDCP SNs of the received RLC PDUs, ordering the sequence, and recording lost RLC PDUs.

The NR MACs 1*d*-15 and 1*d*-30 may be connected to multiple NR RLC layer devices configured in one UE, and the main functions of the NR MAC may include some of the following functions.

Mapping function (Mapping between logical channels and transport channels)
Multiplexing and demultiplexing function (Multiplexing/demultiplexing of MAC SDUs)
Scheduling information reporting function (Scheduling information reporting)
HARQ function (Error correction through HARQ)
Priority handling function between logical channels (Priority handling between logical channels of one UE)
Priority handling function between UEs (Priority handling between UEs by means of dynamic scheduling)
MBMS service identification function (MBMS service identification)
Transport format selection function (Transport format selection)

Padding function (Padding)

NR PHY layers 1d-20 and 1d-25 perform an operation of channel-coding and modulating upper layer data into OFDM symbols to transmit the OFDM symbols via a radio channel, or an operation of demodulating and channel-decoding OFDM symbols received via a radio channel to transmit the demodulated and channel-decoded OFDM symbols to an upper layer.

Figure 1E:
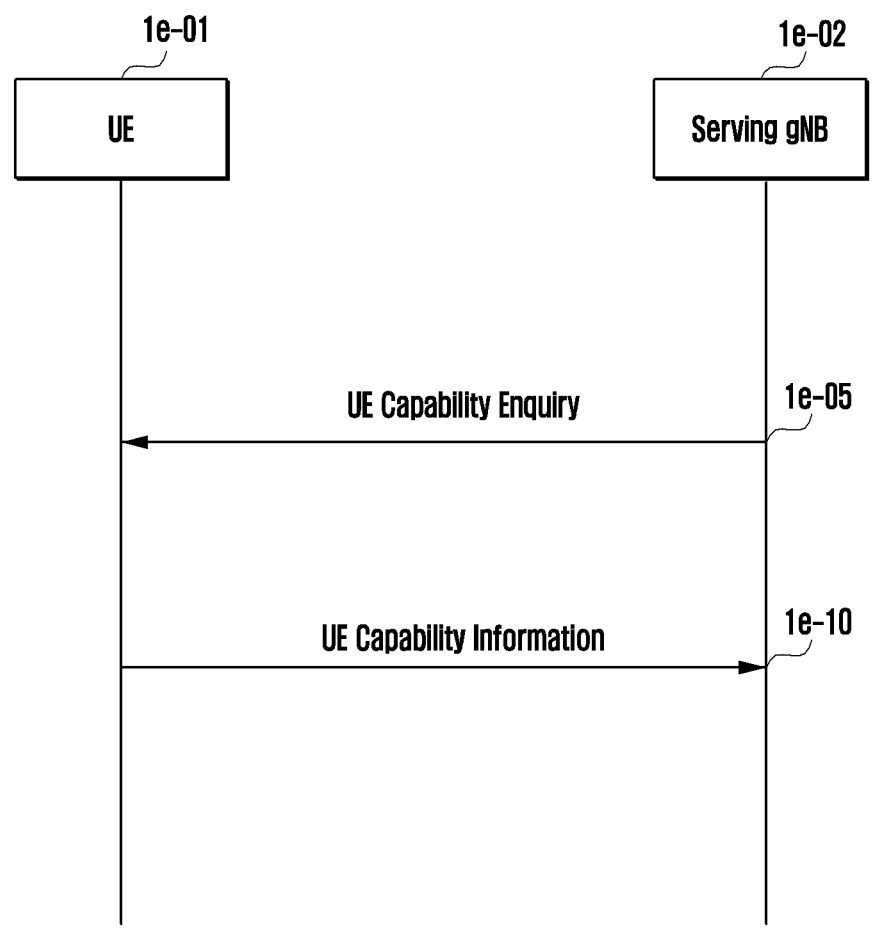
FIG. 1E illustrates a structure of a message for reporting a UE capability in an NR system.

FIG. 1E illustrates a structure of a message for reporting a UE capability in an NR system.

Basically, a UE 1e-01 performs a procedure of reporting a capability supported by the UE to a corresponding base station in a state being connected to a serving base station 1e-02. In operation 1e-05, the base station transmits a UE capability enquiry message for requesting capability reporting to the UE which is in a connected state. The UE capability enquiry message from the base station may include a UE capability request for each RAT type. For example, the RAT type may be NR, EN-DC, NE-DC, or E-UTRA. Accordingly, the base station may request a UE capability for each of the NR, EN-DC, NE-DC, and E-UTRA via the message.

The request for each RAT type may include requested frequency band information. Further, the UE capability enquiry message may request a plurality of RAT types in one RRC message container, or multiple UE capability enquiry messages including a request for each RAT type may be transmitted to the UE. For example, UE capability enquiry of operation 1e-05 may be repeated multiple times, and the UE may configure a UE capability information message corresponding to the repeated UE capability enquiry, and make a report multiple times. In the next-generation mobile communication system, the base station may request a UE capability for MR-DC, including NR, LTE, and EN-DC. For reference, in general, the UE capability enquiry message is initially transmitted after the UE establishes a connection. However, the UE capability enquiry message may be requested under any condition if the base station needs.

In the above operation, the UE, which has received a request for UE capability reporting from the base station, configures a UE capability according to band information and an RAT type requested by the base station. A method for configuring a UE capability by a UE in an NR system is summarized as follows.

1. If a UE receives a list of LTE and/or NR bands from a base station according to a UE capability request, the UE configures a band combination (BC) for EN-DC and NR stand alone (SA). For example, the UE configures a candidate BC list for EN-DC and NR SA, based on bands requested by the base station through FreqBandList. In addition, the bands are prioritized in the order described in the FreqBandList.

2. If an "eutra-nr-only" flag or an "eutra" flag is configured, matters relating to NR SA BCs among the configured candidate BC list are completely removed. This may occur only if an LTE base station (eNB) requests an "eutra" capability.

3. Thereafter, the UE removes fallback BCs from the candidate BC list configured in the above operation. The fallback BCs correspond to a case where a band corresponding to at least one SCell is removed from a super set BC, and a fallback BC is omittable since the super set BC can already cover the fallback BC. This operation is further applied to MR-DC, for example, LTE bands. The BCs remaining after performing the operation are included in the final "candidate BC list".

4. The UE selects BCs to be reported by selecting BCs suitable for the requested RAT type from the final "candidate BC list". In this operation, the UE configures supportedBandCombinationList in a predetermined order. For example, the UE configures BCs and a UE capability to be reported according to a predetermined order of RAT type (nr eutra-nr eutra). In addition, the UE configures featureSetCombination for the configured supportedBandCombinationList and configures a list of "candidate feature set combinations" from a candidate BC list from which a list of fallback BCs (including the same or lower level capability) has been removed. The above "candidate feature set combinations" include all of feature set combinations for NR and EUTRA-NR BC, and may be obtained from feature set combinations of containers of UE-NR-Capabilities and UE-MRDC-Capabilities.

5. Further, if the requested RAT type is eutra-nr and affects, featureSetCombinations are included in both containers of the UE-MRDC-Capabilities and UE-NR-Capabilities. However, the feature set of NR is included only in the UE-NR-Capabilities.

The UE capability is configured and then the UE transmits a UE capability information message including the UE capability to the base station in operation 1e-10. Thereafter, the base station performs suitable scheduling and transmission/reception management for the corresponding UE, based on the UE capability received from the UE.

In the disclosure, in a method for configuring and reporting a UE capability, which is summarized above, a case in which a base station requests a plurality of RAT types through UE-CapabilityRAT-Containers, for example, a case in which a plurality of UE-CapabilityRAT-Requests are transmitted via UECapabilityEnquiry is considered. In this case, in the current standard, it is understood that all UE capabilities are included to fit an RRC message size according to UE implementation, but if a procedure of the standard is accurately followed, there is a possibility that a UE capability included in a specific container may be lost.

Figure 1F:
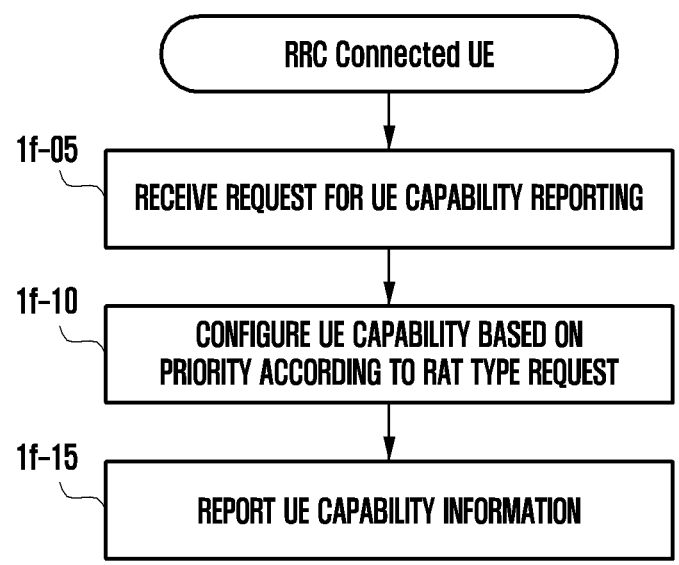
FIG. 1F illustrates an operation when a plurality of RAT types are requested via UECapabilityEnquiry in LTE and NR considered in the disclosure.

FIG. 1F illustrates an operation when a plurality of RAT types are requested via one UECapabilityEnquiry in LTE and NR considered in the disclosure.

A UE in an RRC connected state receives a request for UE capability reporting from a base station in operation 1f-05. In the operation, the UE may receive a plurality of UE-CapabilityRAT-Requests via UECapabilityEnquiry and receive a request for a report of one RAT type. If the plurality of UE-CapabilityRAT-Requests are transmitted via the UECapabilityEnquiry in the operation, the UE configures a UE capability, based on a priority according to an RAT type request in operation 1f-10. For example, in LTE, the UE configures a UE capability container, based on the following priorities.

ue-CapabilityRAT-Container for eutra
ue-CapabilityRAT-Container for geran-cs;
ue-CapabilityRAT-Container for geran-ps;
ue-CapabilityRAT-Container for utra;
ue-CapabilityRAT-Container for cdma2000-1×RTT;
ue-CapabilityRAT-Container for nr;
ue-CapabilityRAT-Container for eutra-nr;

As another example, in NR, the UE configures UE-CapabilityRAT-Containers, based on the following priorities.

ue-CapabilityRAT-Container for nr;
ue-CapabilityRAT-Container for eutra-nr;
ue-CapabilityRAT-Container for eutra;

If the content for MR-DC is determined, additionally, a report for other RAT types has a priority value, and accordingly, the UE is required to make a report.

In operation 1f-15, the UE reports, to the base station, a UE capability information message configured for each of the above priorities. However, in the operation, if the total size of an RRC packet is exceeded, the entire UE capabilities of an RAT type container included at the end or some UE capabilities of the container may be omitted. Since the current standard does not provide a solution to the above problem, capability reporting is required to be performed within the size according to UE implementation. For reference, the size of a UECapabilityInformation message in NR is 9 k Bytes, and the UE is required to configure the UE capability container to be within 9 k Bytes. The disadvantages of the above operation are as follows.

1. More important capabilities may be omitted. For example, from a gNB perspective, an EUTRA capability may be more important than an EN-DC capability.

2. Unnecessary UE capabilities may be reported. For example, an eutra-nr container without an eutra container may be useless.

In the following drawings, solution methods suggested in the disclosure for the above problems are summarized.

Figure 1G:
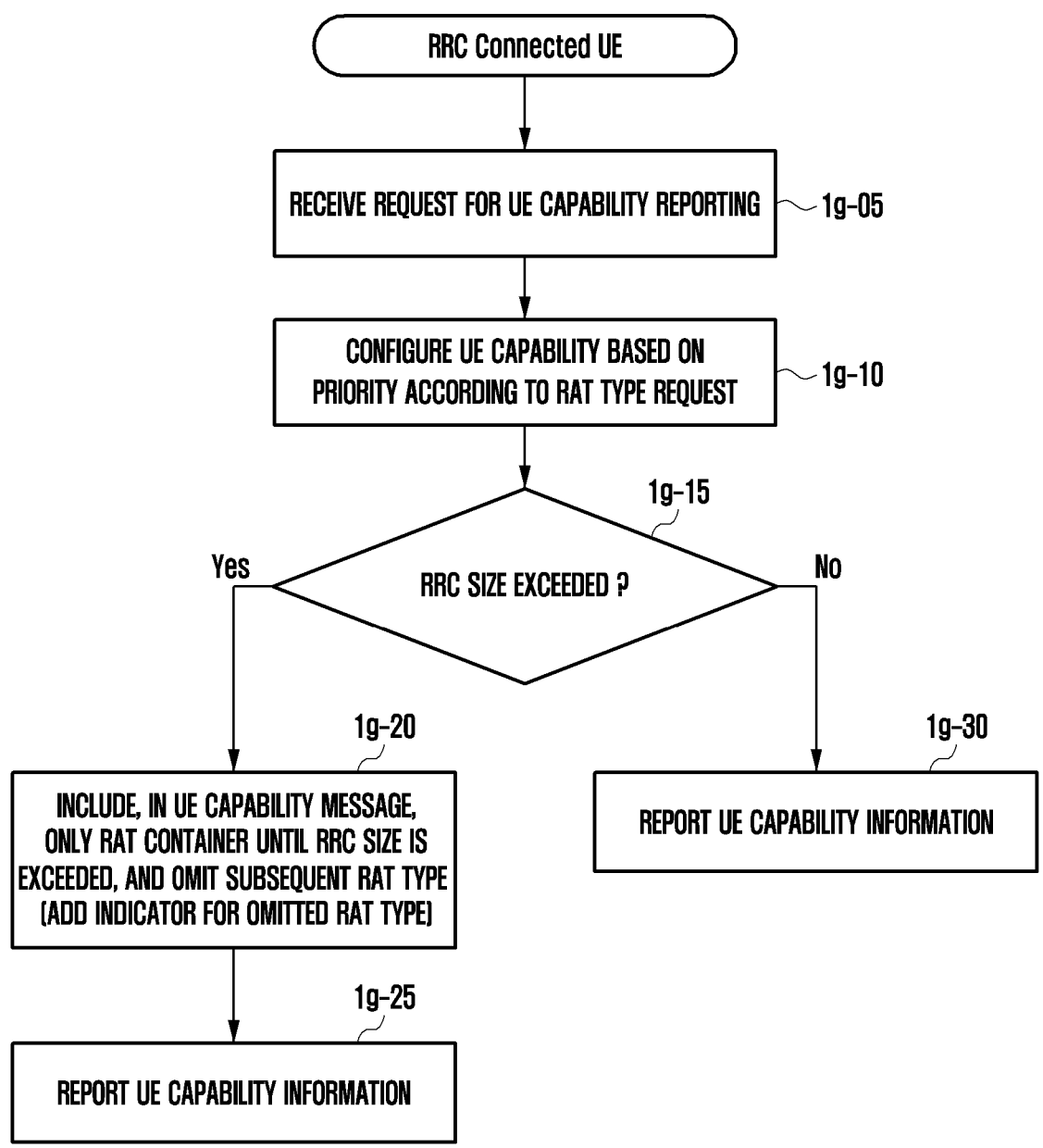
FIGS. 1G to 1K are flowcharts indicating a method for reporting a capability of a UE, according to various embodiments of the disclosure.

FIG. 1G illustrates method 1 for reporting a UE capability when a plurality of RAT types are requested via one UECapabilityEnquiry message, as embodiment 1 proposed in the disclosure.

A UE in an RRC connected state receives a request for UE capability reporting from a base station in operation 1g-05. In the operation, the UE may receive a plurality of UE-CapabilityRAT-Requests via UECapabilityEnquiry and receive a request for a report of one RAT type. If the plurality of UE-CapabilityRAT-Requests are transmitted via the UECapabilityEnquiry in the operation, for example, if a plurality of RAT types are transmitted via one UECapabilityEnquiry message, the UE configures a UE capability, based on a priority according to an RAT type request of the base station in operation 1g-10. For example, the UE may receive an RAT type from the UECapabilityEnquiry message of the base station in the following order.

UE-CapabilityRAT-Request with rat-Type set to
UE-CapabilityRAT-Request with rat-Type set to eutra
UE-CapabilityRAT-Request with rat-Type set to nr-eutra
UE-CapabilityRAT-Request with rat-Type set to eutra-nr In this case, the UE understands that the order of the received RAT types is a priority, and fills UE capability information in a corresponding RAT container. For example, ue-CapabilityRAT-Container is filled in the following order.

ue-CapabilityRAT-Container for nr;
ue-CapabilityRAT-Container for eutra;
ue-CapabilityRAT-Container for nr-eutra;
ue-CapabilityRAT-Container for eutra-nr;

The UE may configure a UE capability information message in the order of the RAT types, and may identify whether the size of an RRC message (a maximum value: 9 k Bytes) is exceeded, in operation 1g-15. If the size of the UE capability information message exceeds the maximum value, in operation 1g-20, the UE may include, in the UE capability information message, only an RAT container until the maximum RRC size is exceeded, and may omit subsequent RAT types. For example, in a case where UE capability information for nr, eutra, and nr-eutra is included, in a case where the maximum RRC size is not exceeded, but UE capability information for eutra-nr is included, and in a case where the maximum RRC size is exceeded, the UE may include only containers for nr, eutra, and nr-eutra in the UE capability information message.

In addition, the UE may add an indicator indicating an RAT type which is omitted to the message. In the above embodiment, the UE may add an indicator indicating that the UE capability information for eutra-nr has been omitted to the message.

According to the addition of the indicator, the base station is aware that the UE has the omitted UE capability, and then may attempt a UE capability request procedure for the corresponding RAT type. This is because, if there is no corresponding indicator, the base station may misrecognize that the UE does not support the corresponding RAT. In operation 1g-25, the UE transmits the configured UE capability information message to the base station.

If the size of UE capability information message is configured as one RRC message size in operation 1g-15, for example, if a UE capability information message is configured to be smaller than the maximum RRC size value, the UE transmits the configured UE capability information message to the base station in operation 1g-30.

Figure 1H:
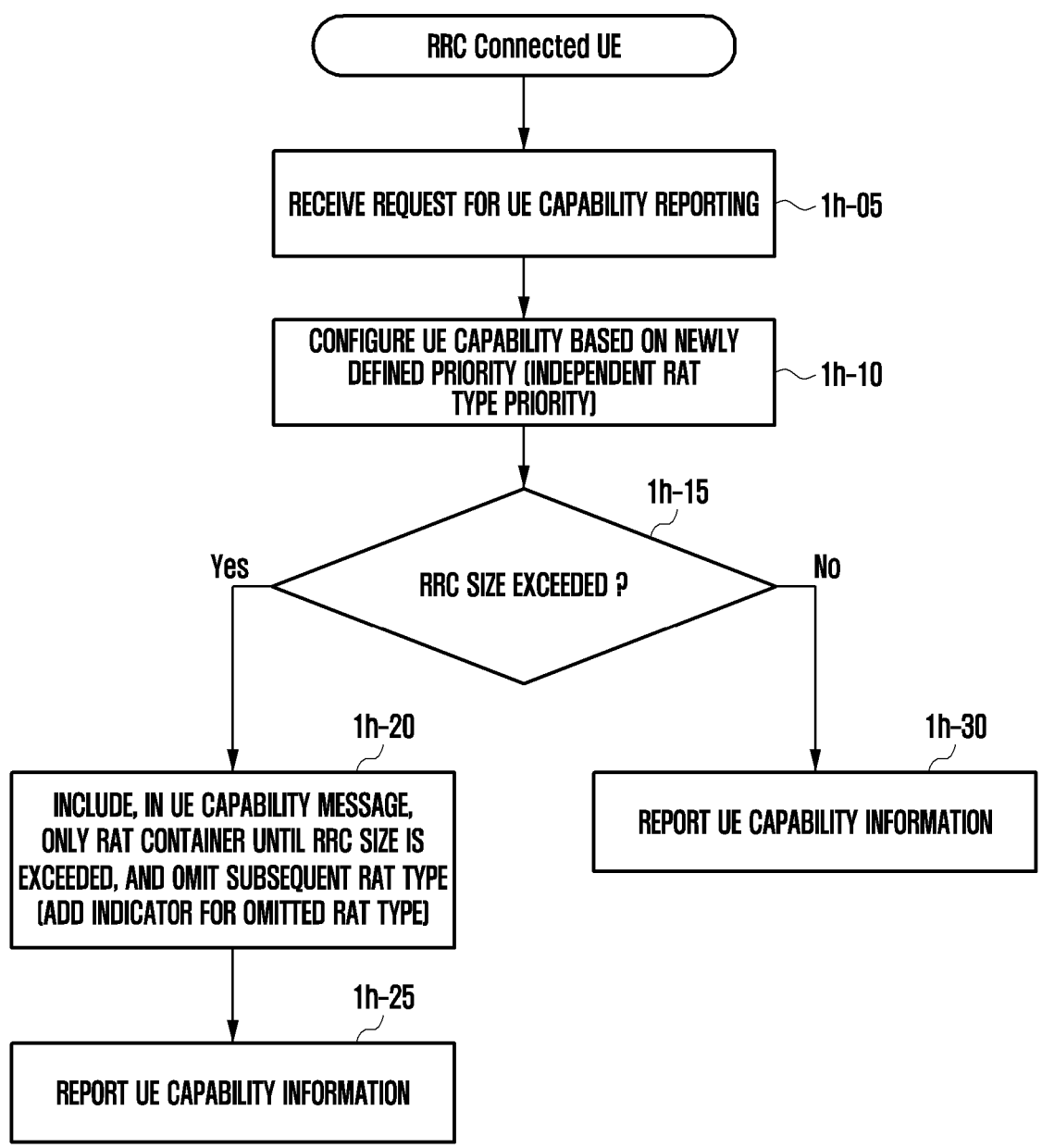

FIG. 1H illustrates method 2 for reporting a UE capability when a plurality of RAT types are requested via one UECapabilityEnquiry message, as embodiment 2 proposed in the disclosure.

A UE in an RRC connected state receives a request for UE capability reporting from a base station in operation 1h-05. In the operation, the UE may receive a plurality of UE-CapabilityRAT-Requests via UECapabilityEnquiry and receive a request for a report of one RAT type. If the plurality of UE-CapabilityRAT-Requests are transmitted via the UECapabilityEnquiry in the operation, for example, if a plurality of RAT types are transmitted via one UECapabilityEnquiry message, the UE configures a UE capability, based on a priority newly defined based on an RAT type request of the base station in operation 1h-10. For example, the UE may receive an RAT type from the UECapabilityEnquiry message of the base station in the following order.

UE-CapabilityRAT-Request with rat-Type set to nr
UE-CapabilityRAT-Request with rat-Type set to eutra
UE-CapabilityRAT-Request with rat-Type set to nr-eutra
UE-CapabilityRAT-Request with rat-Type set to eutra-nr In this case, the UE does not understand that the order of the received RAT types is a priority, and fills UE capability information in a corresponding RAT container based on the report on an independent RAT as a priority. For example, ue-CapabilityRAT-Container may be filled in the following order. For example, the UE may configure an independent RAT for nr and eutra with a high priority, and configure an RAT corresponding to MR-DC with a low priority.

ue-CapabilityRAT-Container for nr;
ue-CapabilityRAT-Container for eutra;
ue-CapabilityRAT-Container for nr-eutra;
ue-CapabilityRAT-Container for eutra-nr;

The present embodiment differs in that a priority is fixed regardless of a request of the base station. A fixed priority different from the above embodiment may be defined.

The UE configures a UE capability information message in the newly defined order of the RAT types, and may identify whether the size of an RRC message (a maximum value: 9 k Bytes) is exceeded, in operation 1h-15. If the size of the UE capability information message exceeds the maximum value, in operation 1h-20, the UE may include, in the UE capability information message, only an RAT container until the maximum RRC size is exceeded, and may omit subsequent RAT types. In addition, an indicator indicating an RAT type which is omitted is added. According to the addition of the indicator, the base station is aware that the UE has the omitted UE capability, and then may attempt a UE capability request procedure for the corresponding RAT type. This is because, if there is no corresponding indicator, the base station may misrecognize that the UE does not support the corresponding RAT. In operation 1h-25, the UE transmits the configured UE capability information message to the base station.

If the size of UE capability information message is configured as one RRC message size in operation 1h-15, for example, if a UE capability information message is configured to be smaller than the maximum RRC size value, the UE transmits the configured UE capability information message to the base station in operation 1h-30.

Figure 1I:
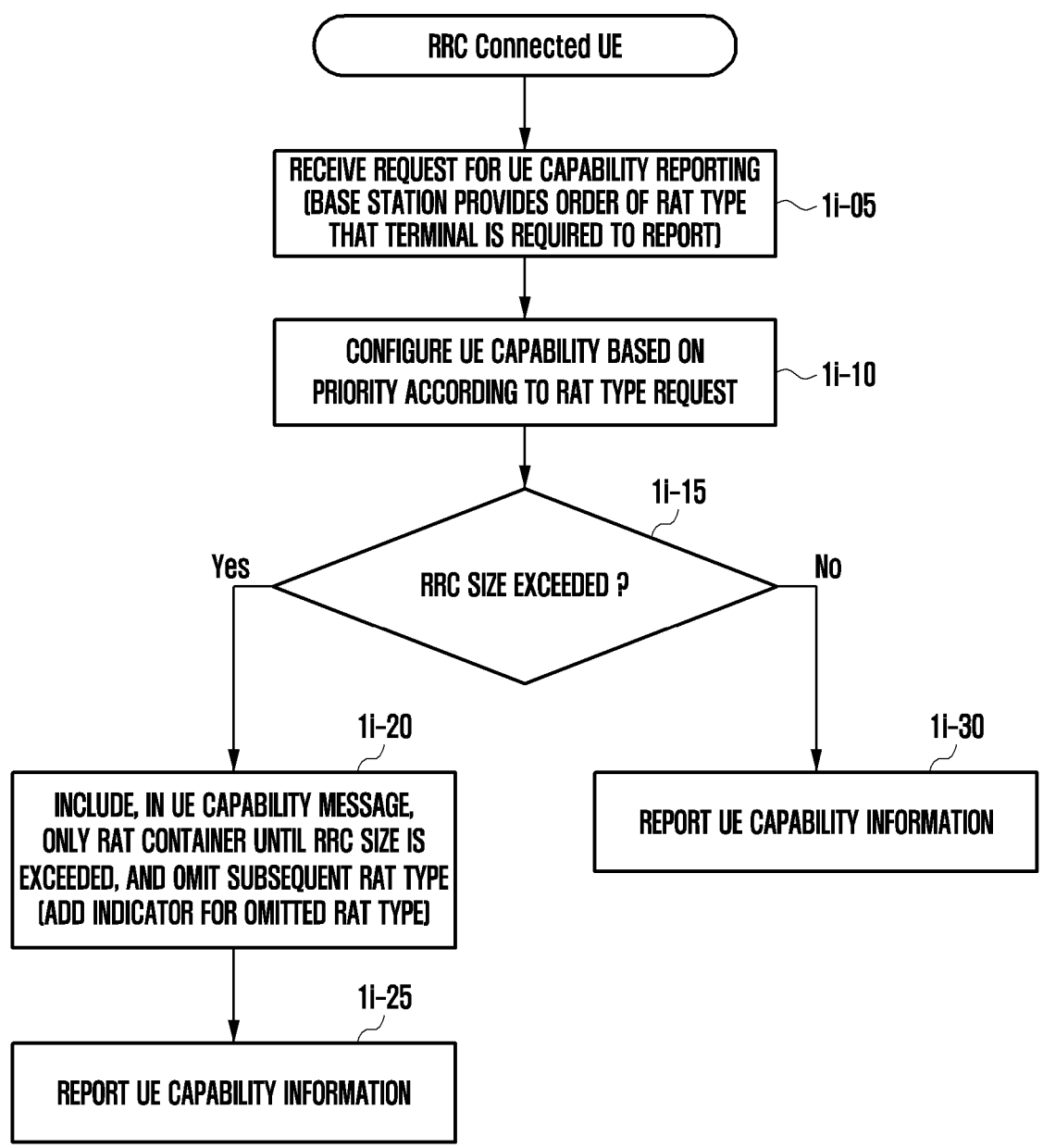

FIG. 1I illustrates method 3 for reporting a UE capability when a plurality of RAT types are requested via one UECapabilityEnquiry message, as embodiment 3 proposed in the disclosure.

A UE in an RRC connected state receives a request for UE capability reporting from a base station in operation 1i-05. In the operation, the UE may receive a plurality of UE-CapabilityRAT-Requests via UECapabilityEnquiry and receive a request for a report of one RAT type. If the plurality of UE-CapabilityRAT-Requests are transmitted via the UECapabilityEnquiry in the operation, for example, if a plurality of RAT types are transmitted via one UECapabilityEnquiry message, the base station may provide a priority of the RAT types that the UE is required to report.

The UE configures a UE capability, based on the priority of the RAT type request provided by the base station, in operation 1i-10. For example, the UE may request to report an RAT type in the following order from the UECapabilityEnquiry message of the base station. For example, the UE may specify to report in the order of nr, eutra, nr-eutra, and eutra-nr.

UE-CapabilityRAT-Request with rat-Type set to nr
UE-CapabilityRAT-Request with rat-Type set to eutra
UE-CapabilityRAT-Request with rat-Type set to nr-eutra
UE-CapabilityRAT-Request with rat-Type set to eutra-nr In this case, the UE understands that the order of the received RAT types is a priority, and fills UE capability information in a corresponding RAT container. For example, ue-CapabilityRAT-Container is filled in the following order.

ue-CapabilityRAT-Container for nr;
ue-CapabilityRAT-Container for eutra;
ue-CapabilityRAT-Container for nr-eutra;
ue-CapabilityRAT-Container for eutra-nr;

The present embodiment is characterized in that the priority is determined according to an explicit request of the base station.

The UE may configure a UE capability information message in the order of RAT types according to the priority, and may identify whether the size of an RRC message (a maximum value: 9 k Bytes) is exceeded, in operation 1i-15. If the size of the UE capability information message exceeds the maximum value, in operation 1i-20, the UE may include, in the UE capability information message, only an RAT container until the maximum RRC size is exceeded, and may omit subsequent RAT types. In addition, the UE may add an indicator indicating an RAT type which is omitted. According to the addition of the indicator, the base station is aware that the UE has the omitted UE capability, and then may attempt a UE capability request procedure for the corresponding RAT type. This is because, if there is no corresponding indicator, the base station may misrecognize that the UE does not support the corresponding RAT. In operation 1i-25, the UE transmits the configured UE capability information message to the base station.

If the size of UE capability information message is configured as one RRC message size in operation 1i-15, for example, if a UE capability information message is configured to be smaller than the maximum RRC size value, the UE transmits the configured UE capability information message to the base station in operation 1i-30.

Figure 1J:
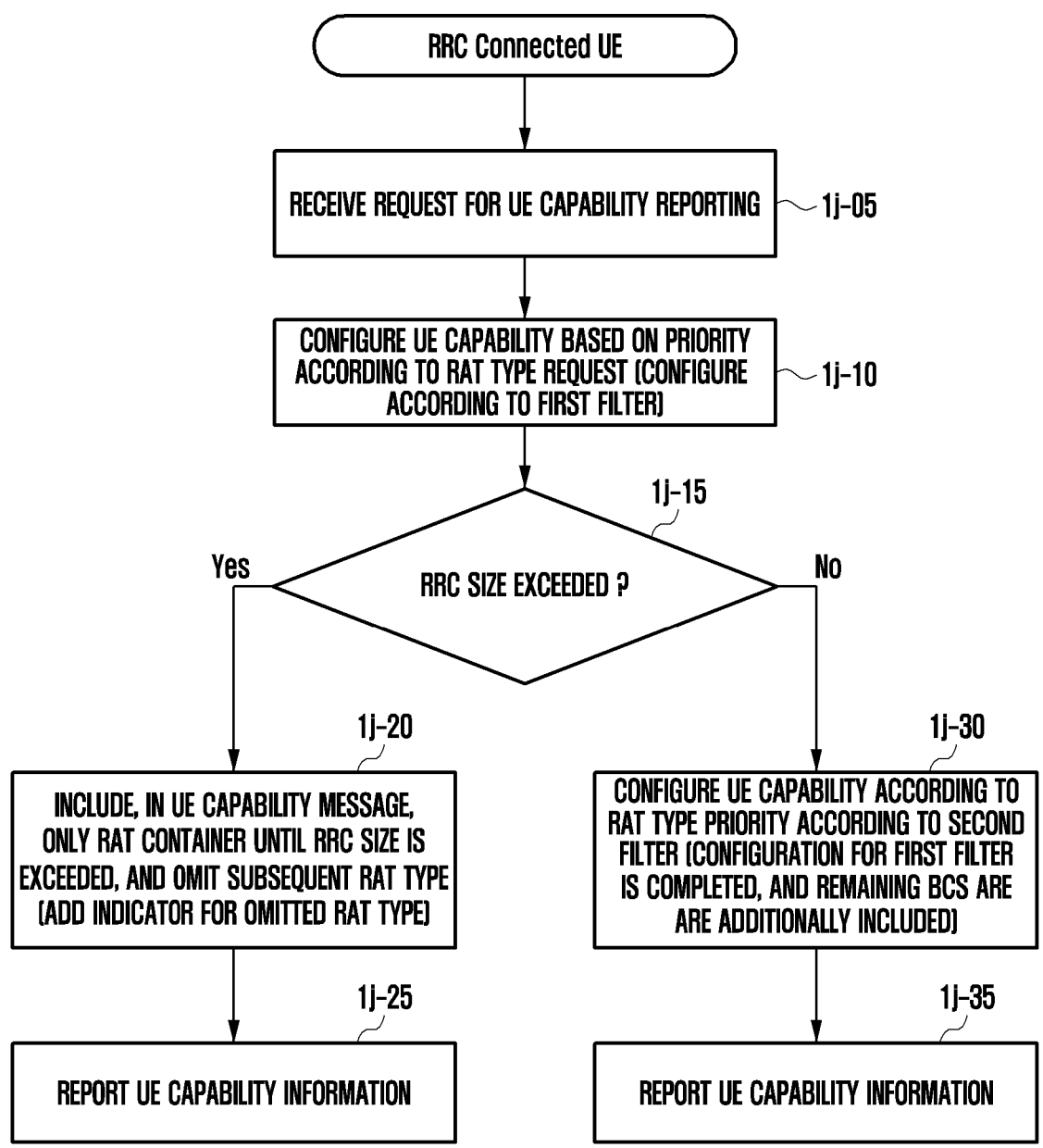

FIG. 1J illustrates method 4 for reporting a UE capability when a plurality of RAT types are requested via one UECapabilityEnquiry message, as embodiment 4 proposed in the disclosure.

A UE in an RRC connected state receives a request for UE capability reporting from a base station in operation 1j-05. In the operation, the UE may receive a plurality of UE-CapabilityRAT-Requests via UECapabilityEnquiry and receive a request for a report of one RAT type. If the plurality of UE-CapabilityRAT-Requests are transmitted via the UECapabilityEnquiry in the operation, for example, if a plurality of RAT types are transmitted via one UECapabilityEnquiry message, the UE configures a UE capability, based on a priority based on an RAT type request of the base station in operation 1j-10. For example, the UE may receive an RAT type from the UECapabilityEnquiry message of the base station in the following order.

UE-CapabilityRAT-Request with rat-Type set to nr
UE-CapabilityRAT-Request with rat-Type set to eutra
UE-CapabilityRAT-Request with rat-Type set to nr-eutra
UE-CapabilityRAT-Request with rat-Type set to eutra-nr In this case, the UE may understand that the order of the received RAT types is a priority, and fill UE capability information in a corresponding RAT container for the first filter. For example, ue-CapabilityRAT-Container is filled in the following order.

ue-CapabilityRAT-Container for nr;
ue-CapabilityRAT-Container for eutra;
ue-CapabilityRAT-Container for nr-eutra;
ue-CapabilityRAT-Container for eutra-nr;

The present embodiment differs in that the UE configures a UE capability by using two (or a plurality of) filters. The order of the RAT types follows the above example, but band and BC information configuring each RAT may be divided into two or more pieces, smaller than the entire set supported by the UE, and processed. For example, after the UE configures the most important band and BC information of each RAT by using filter 1, and fills a UE capability for all RATs by using filter 1, if there is space remaining in the message size, the UE may fill a UE capability for filter 2 according to a priority for all RATs again. Thereafter, if there are more filters, the UE may repeat filling a UE capability as many times as the number of filters.

The UE may configure a UE capability information message in the order of RAT types according to the priority, and may identify whether the size of an RRC message (a maximum value: 9 k Bytes) is exceeded, in operation 1j-15. If the size of the UE capability information message exceeds the maximum value, in operation 1j-20, the UE may include, in the UE capability information message, only an RAT container until the maximum RRC size is exceeded, and may omit subsequent RAT types. In addition, the UE may add an indicator indicating an RAT type which is omitted. According to the addition of the indicator, the base station is aware that the UE has the omitted UE capability, and then may attempt a UE capability request procedure for the corresponding RAT type. This is because, if there is no corresponding indicator, the base station may misrecognize that the UE does not support the corresponding RAT. In operation 1*j*-25, the UE transmits the configured UE capability information message to the base station.

If the size of UE capability information message is configured as one RRC message size in operation 1*j*-15, for example, if a UE capability information message is configured to be smaller than the maximum RRC size value, the UE transmits the configured UE capability information message to the base station in operation 1*j*-30.

Figure 1K:
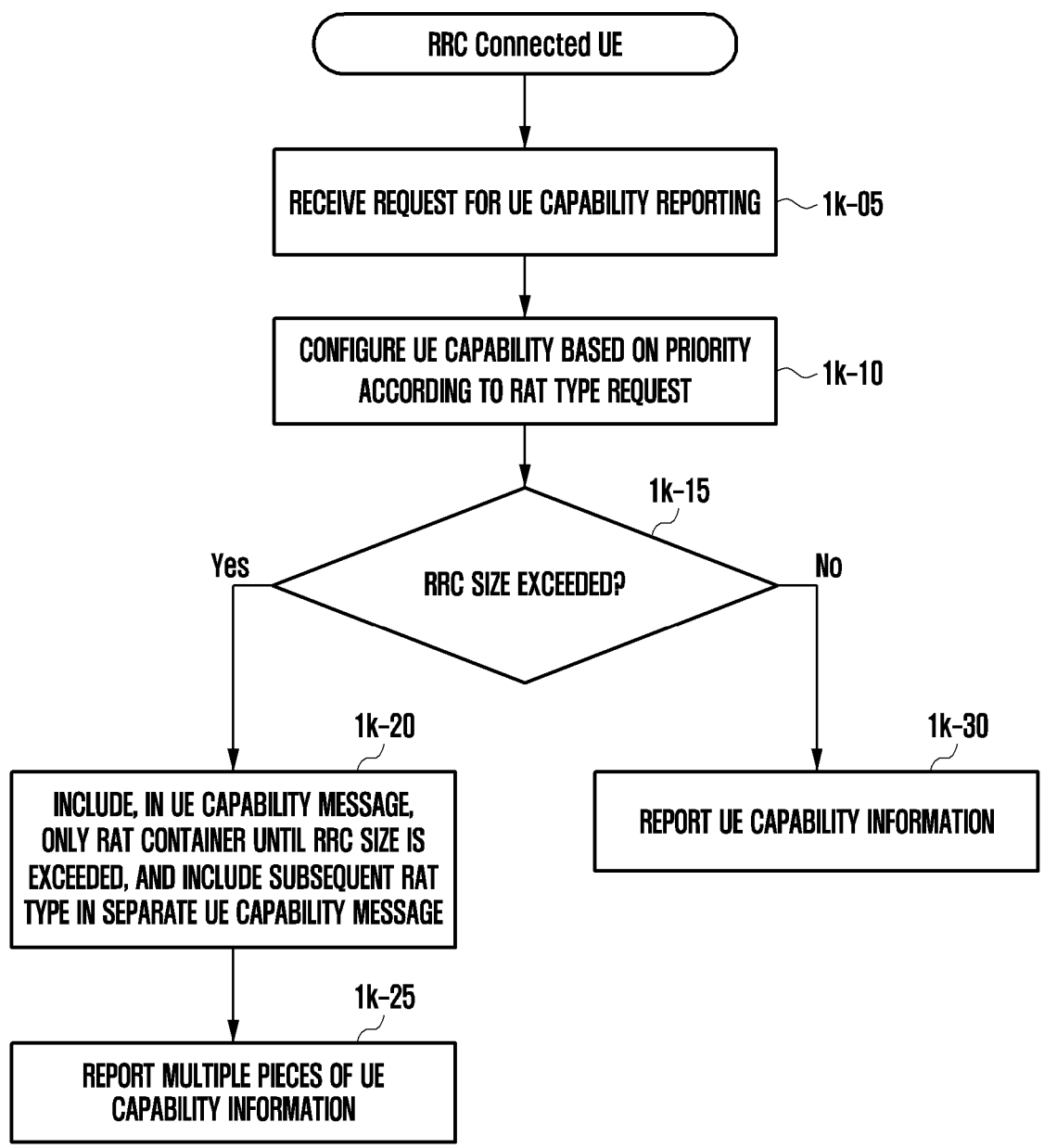

FIG. 1K illustrates method 5 for reporting a UE capability when a plurality of RAT types are requested via one UECapabilityEnquiry message, as embodiment 5 proposed in the disclosure.

A UE in an RRC connected state receives a request for UE capability reporting from a base station in operation 1*k*-05. In the operation, the UE may receive a plurality of UE-CapabilityRAT-Requests via UECapabilityEnquiry and receive a request for a report of one RAT type. If the plurality of UE-CapabilityRAT-Requests are transmitted via the UECapabilityEnquiry in the operation, for example, if a plurality of RAT types are transmitted via one UECapabilityEnquiry message, the UE configures a UE capability, based on a priority based on an RAT type request of the base station in operation 1*k*-10. For example, the UE may receive an RAT type from the UECapabilityEnquiry message of the base station in the following order.

UE-CapabilityRAT-Request with rat-Type set to nr
UE-CapabilityRAT-Request with rat-Type set to eutra
UE-CapabilityRAT-Request with rat-Type set to nr-eutra
UE-CapabilityRAT-Request with rat-Type set to eutra-nr In this case, the UE may understand that the order of the received RAT types is a priority, and fill UE capability information in a corresponding RAT container for the first filter. For example, ue-CapabilityRAT-Container may be filled in the following order.

ue-CapabilityRAT-Container for nr;
ue-CapabilityRAT-Container for eutra;
ue-CapabilityRAT-Container for nr-eutra;
ue-CapabilityRAT-Container for eutra-nr;

The present embodiment differs in that the UE reports a UE capability via two or more RRC messages without reporting the UE capability via one RRC message under a specific condition.

The UE may configure a UE capability information message in the order of RAT types according to the priority, and may identify whether the size of an RRC message (a maximum value: 9 k Bytes) is exceeded, in operation 1*k*-15. If the size of the UE capability information message exceeds the maximum value, in operation 1*k*-20, the UE may include, in the UE capability information message, only an RAT container until the maximum RRC size is exceeded, and may add subsequent RAT types to a new UE capability information message. In addition, the UE may then add an indicator that a UE capability message of the UE is to be transmitted. According to the addition of the indicator, the base station is aware that the UE has the omitted UE capability, and thereafter, may expect that a new UE capability information message is received. If there is no corresponding indicator, the base station may misrecognize that the UE does not support the corresponding RAT.

For example, if information on NR and LTE capabilities is included, the maximum RRC size is not exceeded, but in a case where the maximum RRC size is exceeded if capability information for EN-DC is further included, the first UE capability information message may include NR and LTE capability containers, and the second UE capability information may include a capability container for EN-DC. In addition, the first UE capability information message may include an indicator indicating that a message including the next UE capability information is to be transmitted.

According to another embodiment, each of the plurality of UE capability information messages may include an indicator indicating the position thereof among the messages. In this case, the last UE capability information message may include an indicator indicating that the message is the last message.

The UE may configure the first UE capability information message including UE capability information up to the maximum RRC size regardless of the RAT types. Further, the UE may configure the next UE capability information message for information that the maximum RRC size has been exceeded.

In operation 1*k*-25, the UE sequentially transmits a plurality of configured UE capability information messages to the base station.

If the size of UE capability information message is configured as one RRC message size in operation 1*k*-15, for example, if a UE capability information message is configured to be smaller than the maximum RRC size value even when all capability information for NR, LTE, and EN-DC is included, the UE transmits the configured UE capability information message to the base station in operation 1*k*-30.

Figure 1L:
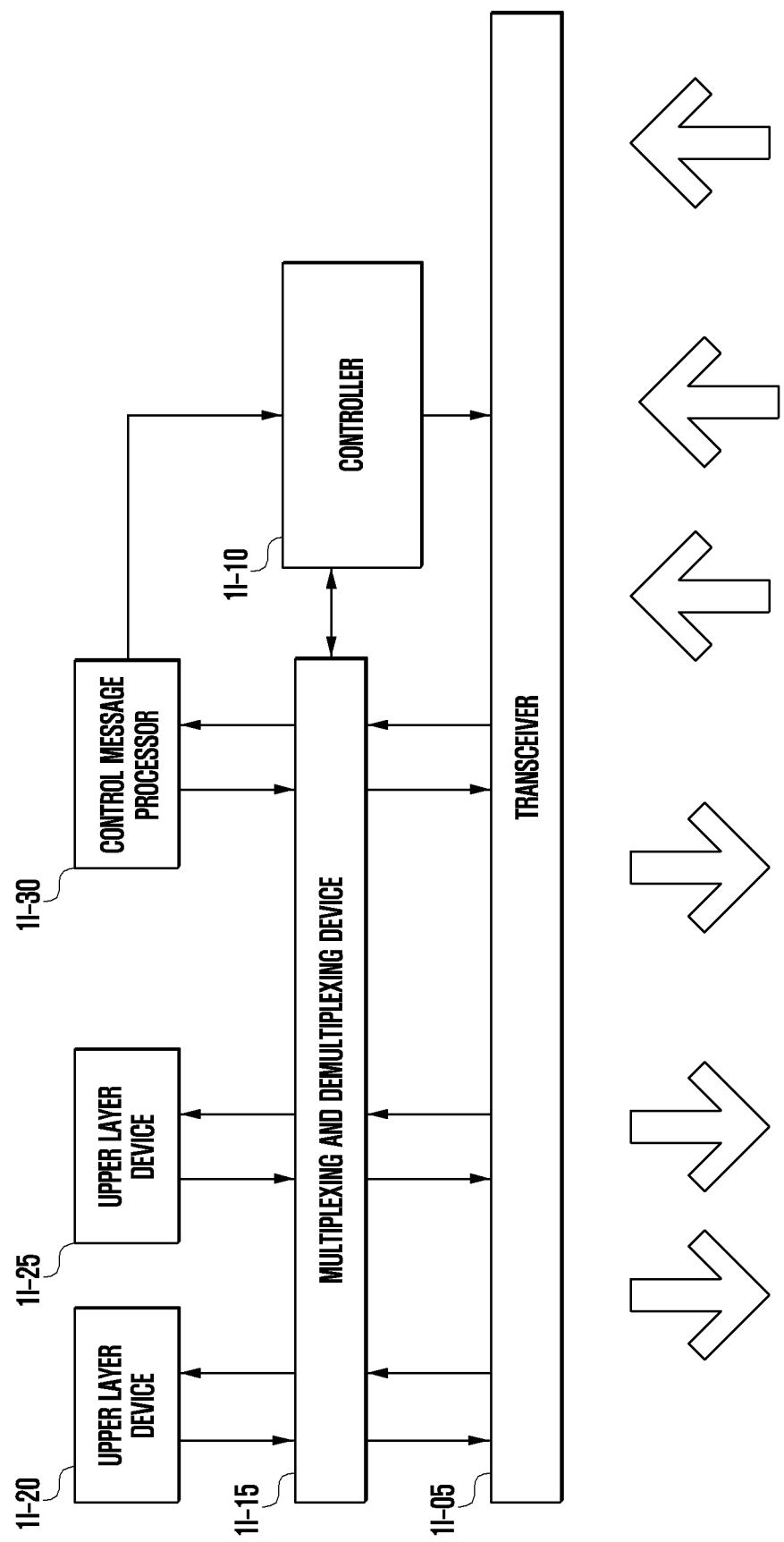
FIG. 1L illustrates a block configuration of a UE according to an embodiment of the disclosure.

FIG. 1L illustrates a block configuration of a UE according to an embodiment of the disclosure.

As shown in FIG. 1L, a UE according to an embodiment of the disclosure includes a transceiver 1*l*-05, a controller 1*l*-10, a multiplexing and demultiplexing unit 1*l*-15, various upper layer processors 1*l*-20 and 1*l*-25, and a control message processor 1*l*-30.

The transceiver 1*l*-05 receives data and a predetermined control signal via a forward channel of a serving cell, and transmits data and a predetermined control signal via a reverse channel. If a plurality of serving cells are configured, the transceiver 1*l*-05 performs data transmission/reception and control signal transmission/reception through the plurality of serving cells. The multiplexing and demultiplexing unit 1*l*-15 multiplexes data generated by the upper layer processors 1*l*-20 and 1*l*-25 or the control message processor 1*l*-30, or demultiplexes data received from the transceiver 1*l*-05, so as to transmit the data to an appropriate upper layer processor 1*l*-20 or 1*l*-25 or the control message processor 1*l*-30. The control message processor 1*l*-30 transmits or receives a control message from a base station, and performs a necessary operation. This operation includes a function of processing a control message such as MAC CE and an RRC message, and an operation of reporting a CBR measurement value, and receiving an RRC message for a resource pool and a UE operation. The upper layer processors 1*l*-20 and 1*l*-25 refer to DRB devices and may be configured for each service. The upper layer processors 1*l*-20 and 1*l*-25 process data generated from a user service such as file transfer protocol (FTP) or voice over Internet protocol (VoIP) to transmit the processed data to the multiplexing and demultiplexing unit 1*l*-15, or process data transmitted from the multiplexing and demultiplexing unit 1*l*-15 to transmit the processed data to an upper layer service application. The controller 1*l*-10 may identify a scheduling command received via the transceiver 1*l*-05, for example, reverse grants, and control the transceiver 1*l*-05 and the multiplexing and demultiplexing unit 1*l*-15 so that reverse transmission is performed using an appropriate transmission resource at an appropriate time. In the above description, it has been described that the UE is configured by a plurality of blocks and each of the blocks performs different functions, but this is only an exemplary embodiment and is not limited thereto.

For example, a function performed by the demultiplexing unit 1*l*-15 may be performed by the controller 1*l*-10 itself.

Figure 1M:
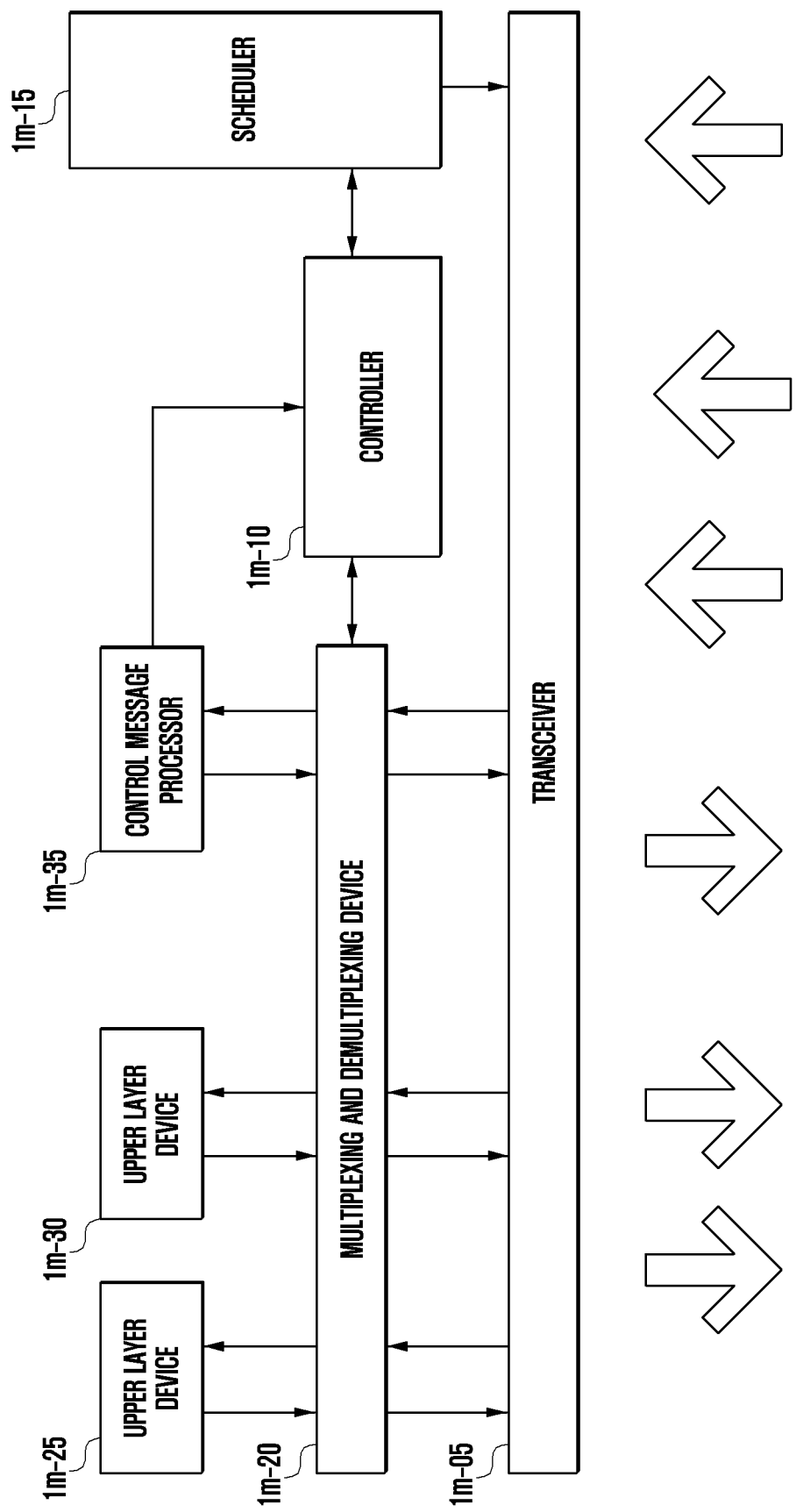
FIG. 1M illustrates a block configuration of a base station according to an embodiment of the disclosure.

FIG. 1M illustrates a block configuration of a base station according to an embodiment of the disclosure.

A base station device of FIG. 1M includes a transceiver 1*m*-05, a controller 1*m*-10, a multiplexing and demultiplexing unit 1*m*-20, a control message processor 1*m*-35, and various upper layer processors 1*m*-25 and 1*m*-30, and a scheduler 1*m*-15.

The transceiver 1*m*-05 transmits data and a predetermined control signal via a forward carrier, and receives data and a predetermined control signal via a reverse carrier. If multiple carriers are configured, the transceiver 1*m*-05 performs data transmission/reception and control signal transmission/reception via the multiple carriers. The multiplexing and demultiplexing unit 1*m*-20 multiplexes data generated by the upper layer processors 1*m*-25 and 1*m*-30 or the control message processor 1*m*-35 or demultiplexes data received from the transceiver 1*m*-05, so as to transmit the data to an appropriate upper layer processor 1*m*-25 or 1*m*-30, the control message processor 1*m*-35, or the controller 1*m*-10. The control message processor 1*m*-35 receives an indication from the controller, generates a message to be transmitted to a UE, and transmits the message to a lower layer. The upper layer processors 1*m*-25 and 1*m*-30 may be configured for each service with regard to each UE, and process data generated from a user service such as FTP or VoIP to transmit the processed data to the multiplexing and demultiplexing unit 1*m*-20, or process data transmitted from the multiplexing and demultiplexing unit 1*m*-20 to transmit the processed data to an upper layer service application. The scheduler 1*m*-15 allocates a transmission resource to a UE at an appropriate time in consideration of an active time of the UE and a channel state and a buffer state of the UE, and processes a signal transmitted by the UE to the transceiver or processes a signal to be transmitted to the UE.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of a terminal in a wireless communication system, the method comprising:
   receiving, from a base station, a request message for requesting terminal capability information, wherein the request message includes radio access technology (RAT) type information indicating at least one RAT type for requesting a terminal capability, wherein the RAT type information indicates at least one of a new radio (NR), an evolved universal terrestrial radio access (E-UTRA)-NR or an E-UTRA;
   identifying whether the RAT type information indicates the NR;
   generating first capability information associated with the NR, in case that the RAT type information indicates the NR;
   identifying whether the RAT type information indicates the E-UTRA-NR;
   generating second capability information associated with the E-UTRA-NR, in case that the RAT type information indicates the E-UTRA-NR;
   identifying whether the RAT type information indicates the E-UTRA;
   generating third capability information associated with the E-UTRA, in case that the RAT type information indicates the NR;
   identifying a size of a response message including at least one of the first capability information, the second capability information, or the third capability information;
   determining whether to segment the response message based on the identified size; and
   transmitting, to the base station, at least one response message based on a result of the determination.

2. The method of claim 1, further comprises:
   determining to segment the response message, in case that the size of the response message exceeds a maximum size; and
   transmitting, to the base station, a plurality of segmented response messages.

3. The method of claim 2, wherein the plurality of segmented response messages includes information associated with the response message being segmented.

4. A terminal in a wireless communication system, the terminal comprising:
   a transceiver; and
   a controller configured to:

control the transceiver to receive, from a base station, a request message for requesting terminal capability information, wherein the request message includes radio access technology (RAT) type information indicating at least one RAT type for requesting a terminal capability, wherein the RAT type information indicates at least one of a new radio (NR), an evolved universal terrestrial radio access (E-UTRA)-NR or an E-UTRA, identify whether the RAT type information indicates the NR, generate first capability information associated with the NR, in case that the RAT type information indicates the NR, identify whether the RAT type information indicates the E-UTRA-NR, generate second capability information associated with the E-UTRA-NR, in case that the RAT type information indicates the E-UTRA-NR, identify whether the RAT type information indicates the E-UTRA, generate third capability information associated with the E-UTRA, in case that the RAT type information indicates the NR, identify a size of a response message including at least one of the first capability information, the second capability information, or the third capability information, determine whether to segment the response message based on the identified size, and control the transceiver to transmit, to the base station, at least one response message based on a result of the determination.

5. The terminal of claim 4, wherein the controller is further configured to:

determine to segment the response message, in case that the size of the response message exceeds a maximum size, and control the transceiver to transmit, to the base station, a plurality of segmented response messages.

6. The terminal of claim 5, wherein the plurality of segmented response messages includes information associated with the response message being segmented.

7. A method of a base station in a wireless communication system, the method comprising:

transmitting, to a terminal, a request message for requesting terminal capability information, wherein the request message includes radio access technology (RAT) type information indicating at least one RAT type for requesting a terminal capability; and receiving, from the terminal, at least one response message, in case that the terminal capability information according to the at least one RAT type indicated by the RAT type information is generated based on the request message, and a size of a response message is identified, wherein whether to segment the response message is determined based on the identified size, and the at least one response message is received based on a result of the determination, wherein the RAT type information indicates at least one of a new radio (NR), an evolved universal terrestrial radio access (E-UTRA)-NR or an E-UTRA, wherein first capability information associated with the NR is generated, in case that the RAT type information indicates the NR, wherein second capability information associated with the E-UTRA-NR is generated, in case that the RAT type information indicates the E-UTRA-NR, wherein third capability information associated with the E-UTRA is generated, in case that the RAT type information indicates the NR, and wherein the terminal capability information is generated based on at least one of the first capability information, the second capability information, or the third capability information.

8. The method of claim 7, wherein the receiving further comprises:

receiving, from the terminal, a plurality of segmented response messages, in case that the size of the response message exceeds a maximum size.

9. The method of claim 8, wherein the plurality of segmented response messages includes information associated with the response message being segmented.

10. A base station in a wireless communication system, the base station comprising:

a transceiver; and a controller configured to:

control the transceiver to transmit, to a terminal, a request message for requesting terminal capability information, wherein the request message includes radio access technology (RAT) type information indicating at least one RAT type for requesting a terminal capability, and receive, from the terminal, at least one response message, in case that the terminal capability information according to the at least one RAT type indicated by the RAT type information is generated based on the request message, and a size of a response message is identified, wherein whether to segment the response message is determined based on the identified size, and the at least one response message is received based on a result of the determination, wherein the RAT type information indicates at least one of a new radio (NR), an evolved universal terrestrial radio access (E-UTRA)-NR or an E-UTRA, wherein first capability information associated with the NR is generated, in case that the RAT type information indicates the NR, wherein second capability information associated with the E-UTRA-NR is generated, in case that the RAT type information indicates the E-UTRA-NR, wherein third capability information associated with the E-UTRA is generated, in case that the RAT type information indicates the NR, and wherein the terminal capability information is generated based on at least one of the first capability information, the second capability information, or the third capability information.

11. The base station of claim 10, wherein the controller is configured to:

control the transceiver to receive, from the terminal, a plurality of segmented response messages, in case that the size of the response message exceeds a maximum size.

12. The base station of claim 11, wherein the plurality of segmented response messages includes information associated with the response message being segmented.

* * * * *